United States Patent [19]
Murr

[11] 3,740,078
[45] June 19, 1973

[54] UNIVERSALLY PIVOTAL TOW HITCH APPARATUS

[76] Inventor: Julius W. Murr, 200 Huntington, Euless, Tex. 76039

[22] Filed: Aug. 23, 1971

[21] Appl. No.: 173,782

[52] U.S. Cl. .......................................... 280/478 R
[51] Int. Cl. ........................... B60d 1/06, B60d 1/10
[58] Field of Search .................... 280/477, 478, 482

[56] References Cited
UNITED STATES PATENTS

| | | | |
|---|---|---|---|
| 1,422,189 | 7/1922 | Eckertz | 280/478 A |
| 2,194,087 | 3/1940 | Jager | 280/478 R X |
| 2,197,157 | 4/1940 | Reynolds | 280/477 |
| 2,327,308 | 8/1943 | Johnston | 280/482 |
| 2,988,383 | 6/1961 | Carson | 280/478 A |
| 3,326,573 | 6/1967 | Neitzey | 280/482 |

Primary Examiner—Leo Friaglia
Attorney—William T. Wofford, Robert A. Felsman, James C. Fails and Arthur F. Zobal

[57] ABSTRACT

Tow hitch apparatus for connecting a trailing vehicle onto a towing vehicle having a tow hitch thereon characterized by a tongue, a coupling head connected to a forward end of the tongue, a draft member connected to the trailing vehicle, and a universally pivotal connection means for connecting the tongue with the draft member whereby the coupling head can be connected with the tow hitch regardless of misalignment, either vertically or laterally. In specific embodiments, a winch and cable are provided for effecting alignment after the coupling head is connected; locking means are provided for locking the tongue and draft member into alignment; the tongue comprises telescopically mounted members; and locking and limit means are provided for control of the draft length of the telescopically mounted members.

7 Claims, 4 Drawing Figures

PATENTED JUN 19 1973 3,740,078

INVENTOR
Julius W. Murr
BY
Wofford, Felsman & Fails
ATTORNEYS

UNIVERSALLY PIVOTAL TOW HITCH APPARATUS

BACKGROUND OF THE INVENTION

1. Field of the Invention

This invention relates to tow hitch apparatus for connecting a trailing vehicle onto a towing vehicle. More particularly, this invention relates to tow hitch apparatus for comparatively lightweight trailers which must be more or less frequently attached to a towing vehicle such as an ordinary automobile, pickup, or farm tractor.

2. Description of the Prior Art

Tow hitch devices of the general nature of this invention have been well known for a long period of time. There are, however, many situations in which the prior art tow hitch devices have not been satisfactory. For example, the tow hitch devices of the prior art have required very accurate placement of a tow hitch on the rear of the towing vehicle in order to facilitate connection of the towed vehicle, even when the coupling head of the towed vehicle can be lifted by only one person. Frequently, the person making the connection is the operator of the tow vehicle, and he is required to make a plurality of tries to effect connection. With heavy trailing vehicles the draft member must be provided with jacks, draw screws, and the like to take care of the weight of the draft member and the part of the trailing vehicle bearing thereon; make even more imperative accurate alignment of the tow hitch and the coupling head.

The prior art has provided devices which are manipulatable in one plane; such as, the vertical plane; to help relieve this objection; these prior art devices have not been completely satisfactory, however, since they were limited to uniplanar operation with respect to the draft member of the trailing vehicle.

DESCRIPTION OF PREFERRED EMBODIMENTS

It is an object of this invention to provide a tow hitch apparatus that obviates the disadvantages of the prior art structure and enables effecting a coupling intermediate a trailing vehicle and a towing vehicle regardless of whether or not there is exact alignment of a coupling head on the trailing vehicle and a tow hitch on the towing vehicle.

It is also an object of this invention to provide a tow hitch apparatus that facilitates compensating for distance separation, as well as misalignment between the coupling head and the trailer hitch on the towing and trailing vehicles.

Other specific objects will become apparent from the descriptive matter hereinafter, particularly when taken in conjunction with the drawings.

Figure 1:
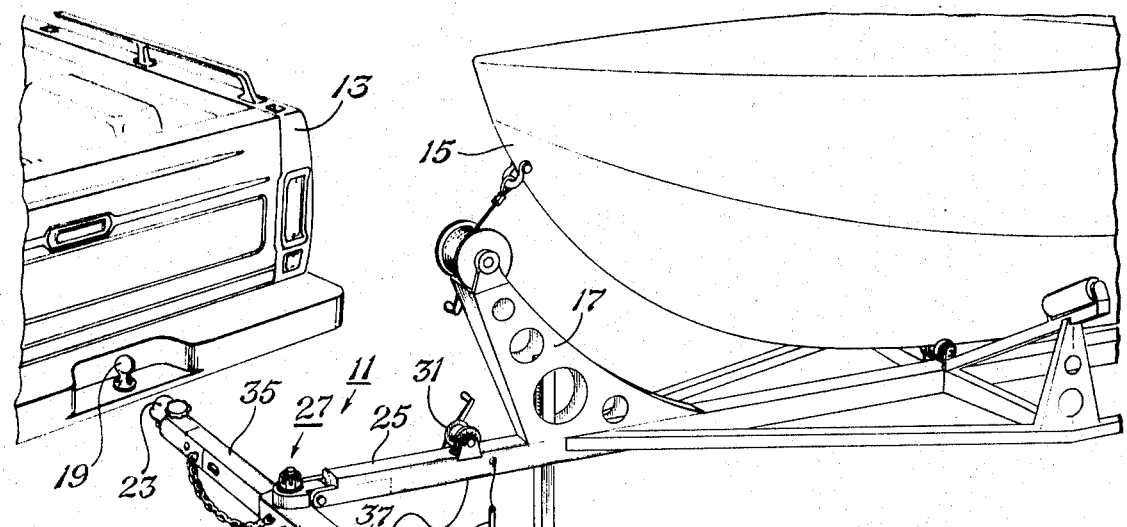
FIG. 1 is a partial isometric view of towed and towing vehicles, illustrating one embodiment of this invention.

Referring to FIG. 1, the tow hitch apparatus 11 is illustrated as it is employed to effect the connection between a towing vehicle in the form of pickup 13 and a trailing vehicle in the form of boat and trailer 15 and 17. Pickup 13 has a tow hitch in the form of a ball hitch 19 thereon. Tow hitch apparatus 11 comprises a tongue 21, a coupling head 23 connected to the forward end of the tongue, a draft member 25 connected with the trailer 17, and a connection means 27 for connecting the tongue with the draft member. As illustrated, the tow hitch apparatus 11 also includes, as a means for forcing alignment, a serially connected flexible lineal member such as cable 29 and a retraction means such as winch 31 for effecting alignment of the tongue 21 and the draft member 25 after connection has been made to the towing vehicle such as pickup 13. The cable 29 and the winch 31 are serially connected with the draft member 25 and with the tongue rearwardly of the connection means 27.

The ball hitch 19 and the coupling head 23 are conventional ball and socket hitches that are commercially available; and typify the types of tow hitch connection means which may be employed for connecting a trailing vehicle onto a towing vehicle. Any of the conventional tow hitches; such as, mating members having matching holes through which a pin may be inserted; may be employed, if desired, instead of the ball and socket type tow hitch. The coupling head 23 is connected to the forward end of the tongue 21 by any conventional means such as nuts and bolts 33, FIG. 2.

Figure 2:
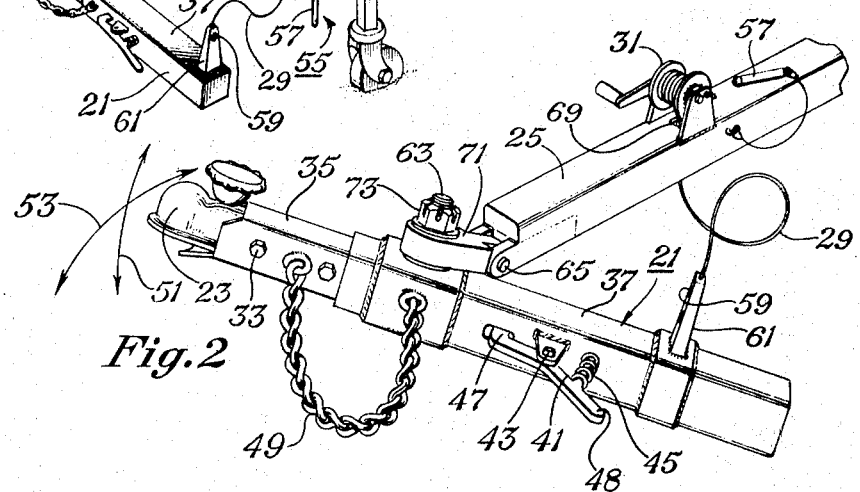
FIG. 2 is a partial isometric view of the embodiment of FIG. 1, with tongue unextended.
Figure 3:
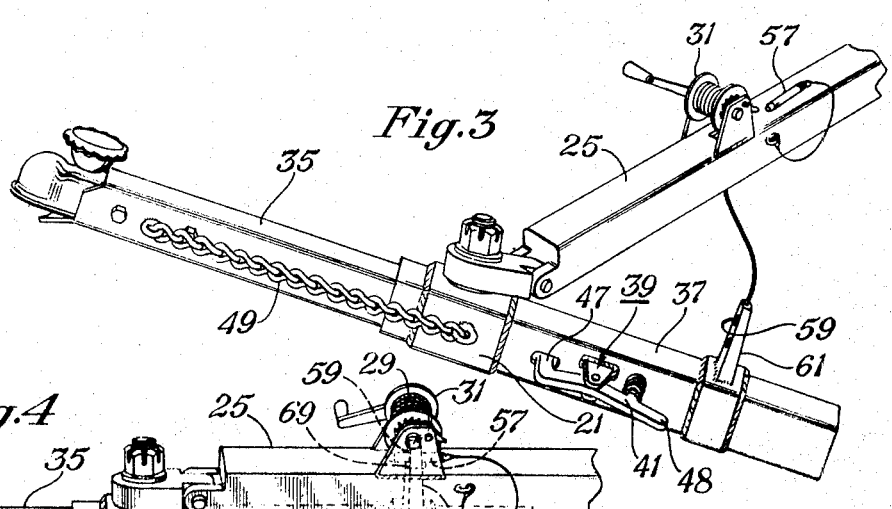
FIG. 3 is an isometric view of the embodiment of FIG. 2 with the tongue extended.
Figure 4:
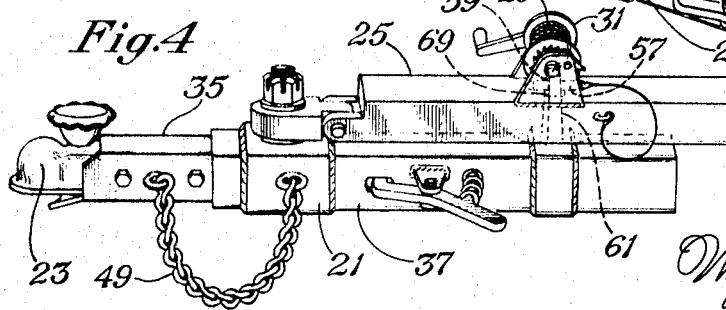
FIG. 4 is an isometric view of the embodiment of FIG. 3 in the draft position.

The tongue 21 comprises a plurality of telescopically mounted members including at least forward member 35 and rearward member 37. The forward member 35 is extensible with respect to the rearward member 37, as illustrated in FIGS. 1 and 3, such that the coupling head 23 can be moved a distance to connect with the ball hitch 19 without having to move the pickup 13 or trailer 17. As illustrated in FIGS. 2 and 4, however, the tongue 21 has a normal draft, or pulling, length in which the forward member 35 is retracted, or moved rearwardly, with respect to the rearward member 37. An automatic locking means 39 is provided for automatically locking the members 35 and 37 in the tongue 21 at a desired draft length, as illustrated in FIGS. 2 and 4, when the forward member 35 is moved rearwardly with respect to the rearward member 37.

The automatic locking means 39 comprises a lever 41 that is mounted for pivotal movement about a suitable mounting shaft 43. A biasing means such as spring 45 urges the lever 41 into the locked position. The lever 41 has a protrusion 47; FIGS. 2 and 3, for engaging a slot or recess in the forward member 35 so as to automatically lock it at a desired draft position when the slot or recess is emplaced beneath the protrusion 47. The protrusion 47 is moved inwardly in response to urging by the spring 45 to engage the slot as illustrated in FIG. 2. On the other hand, the rearward end 48 of the lever 41 may be pushed inwardly to remove the protrusion 47 from the slot, as is illustrated in FIG. 3.

A limit means in the form of a second flexible lineal member such as chain 49 is employed to limit forward movement of the forward member with respect to the rearward member and provide a safety factor in addition to any mechanical stops that may be located on the telescopically mounted members 35 and 37.

The draft member 25 is a conventionally employed member having the requisite structrual strength to bear its portion of the weight of the trailing vehicle and effect the desired towing thereof. Any of the conventionally employed shapes and strengths of members may be employed for draft member 25.

The connection means 27 connects the forward end of the draft member 25 with the tongue 21 medially with the ends of the tongue. The connection means 27 effects a universally pivotal connection such that the coupling head 23 may be moved vertically and laterally along any axis to effect connection with the ball hitch 19. The universal movement is effected by a first portion of the connection means allowing movement vertically, as illustrated by vertical arrows 51 and a second portion which allows movement horizontally, or laterally, as indicated by lateral arrows 53. The first portion of the connection means 27 comprises a vertically movable member 71 that is mounted for pivotal movement about bolt shaft 65 for effecting the requisite movement reciprocally in a vertical plane. The second portion of the connection means 27 comprises bolt shaft 63 carried by the tongue 21, penetrating rotatably through vertically movable member 71, and having a suitable lock nut 73 for fastening so as to allow the requisite rotational movement in a horizontal plane, or lateral movement. Thus, it can be seen, that through simultaneous movement vertically and horizontally, the coupling head 23 may be moved along any azimuth with respect to its aligned position to effect the desired connection. The ability to move the coupling head 23 along any azimuth with respect to its aligned position, conjunctively with being able to move the forward member 35 with respect to the rearward member 37 of the tongue 21, facilitates making an interconnection with the ball hitch 19, regardless of misalignment and distance separation therebetween.

As illustrated, the winch 31 is a ratchet winch that may be ratchet locked for safety once the alignment of the tongue and the draft member has been effected, as by drawing the cable 29 onto the winch, as illustrated in FIG. 4.

A locking means 55 is provided for locking the tongue 21 and the draft member 25 together. As illustrated, the locking means 55 comprises pin 57 that is connected with the draft member 25 to prevent being lost, and aperture 59 in mount 61. The mount 61 is carried by the rearward member 37 rearwardly of the connection means 27 to enable the winch 31 to apply a torsional force about the bolt shaft 63 and a pivotal force about bolt shaft 65 to effect the desired alignment of the tongue 21 and the draft member 25. The draft member 25 has an aperture 69 through which mount 61 protrudes when the tongue 21 and draft member 25 are aligned, as illustrated in FIG. 4. The pin 57 is then inserted through the aperture 59 in the mount 61 to prevent its moving downwardly through the aperture 69 in the draft member 25. In this way, alignment is maintained both by the ratchet-locked winch 31 and by the locking means 55.

In operation, the towing vehicle, such as pickup 13 is backed by the operator to place ball hitch 19 in the vicinity of the coupling head 23 carried on trailer 17. In the prior art apparatus, if the ball hitch 19 were not closely adjacent, and in some instances immediately beneath the coupling head 23, the operator would have to reposition the towing vehicle. In this invention, however, the lever 41 of the automatic locking means is released and the coupling head 23 is moved in the desired azimuth for the necessary distance to effect connection with ball hitch 19, as delineated hereinbefore. To properly effect the connection, the connection means 27 should be at least as low as the ball hitch 19. Ordinarily, the same vehicle is employed for towing the trailer 17 to and from the location where used and no problem is encountered in this regard. It is advisable, however, to provide clearance between the connection means 27 and the surface, as by the illustrated and adjustable support wheel, to allow the desired universal movement of the coupling head 23. To effect the desired movement of the coupling head, the ratchet of the winch 31 is released so that the cable 29 may be played out as required. After connection has been established between the coupling head 23 and the ball hitch 19, the winch 31 may be rotated to "winch-in" the cable 29 to effect the necessary alignment of the draft member 25 and the tongue 21. After the desired alignment between the tongue 21 and the draft member 25 has been effected, the mount 61 will protrude through the aperture 69. The pin 57 of the locking means 55 is inserted through the aperture 59 to further lock the mount 61 in place. The ratchet winch is also ratchet-locked, thereby effecting a second locking in the aligned position.

Once the trailer has been towed to a place where the pickup 13 may be moved rearwardly with respect to the trailer 17; the rearward movement is effected, allowing the protrusion 47 to latch into the slot or recess in the forward member 35 and effect the desired draft length of the tongue 21 for towing the vehicle on the highway or the like. As can be seen in FIG. 3, the chain 49 provides tensional reinforcement of the forward member 35 during its extended position such that additional tension may be effected for towing the trailer 17 out of sand or the like, without the danger of damaging or knocking off any mechanical limits on the forward member 35 engaging the rearward member 37.

The term "telescopically" mounted is employed herein in its generic sense to mean that the forward member 35 is movable reciprocally longitudinally with respect to the rearward member 37 and is not intended to require that one member be mounted substantially completely internally with respect to the other. The exact form of the reciprocal movement will depend on the form of the structure of the members 35 and 37; for example, where the members are tubular goods such as the square tubes illustrated, or cylindrically shaped tubes, the telescopic mounting may be true in its limited sense. On the other hand, where I-shaped members or angle shaped members are employed, the reciprocal movement may not be movement of one member internally of another.

The materials of construction ordinarily employed in this art may be employed herein and no exotic new materials are necessary.

Although the invention has been described with a certain degree of particularity, it is understood that the present disclosure has been made only by way of example, and that numerous changes in the details of construction and the combination and arrangement of parts may be resorted to without departing from the spirit and the scope of the invention.

What is claimed is:

1. Tow hitch apparatus for connecting a trailing vehicle onto a towing vehicle having a tow hitch thereon comprising:

a. a tongue;

b. a coupling head connected to the forward end of said tongue;

c. a draft member connected to said trailing vehicle;

d. connection means for connecting said tongue with said draft member; said connection means connecting the forward end of said draft member with said tongue medially of the ends of said tongue and effecting a universally pivotal connection such that said coupling head may be moved vertically and laterally with respect to its aligned position to effect connection with the tow hitch even though the draft member is not aligned therewith; and e. alignment forcing means connected with said draft member and said tongue rearwardly of the point of connection of said connection means with said tongue and having a mechanical advantage for forcing lateral and vertical alignment between said tongue and said draft member.

2. The apparatus of claim 1 wherein said alignment forcing means comprises a serially connected flexible lineal member and retraction means for effecting alignment of said tongue and said draft member.

3. The apparatus of claim 2 wherein said retraction means comprises a ratchet winch that may be ratchet locked for safety after said lineal member has been retracted to affect the desired alignment of said tongue and said draft member.

4. The apparatus of claim 3 wherein a locking means is provided for additionally locking said tongue and said draft member together once they are aligned and brought together.

5. The apparatus of claim 1 wherein said tongue comprises a plurality of members comprising at least a forward member and a rearward member mounted for relative reciprocal movement of said forward member with respect to said rearward member, and automatic locking means is provided for automatically locking said members at a desired draft length when the forward member is moved rearwardly with respect to the rearward member.

6. The apparatus of claim 1 wherein said connection means comprises first and second portions that allow movement of forward and rearward ends of said tongue vertically and laterally for connecting said coupling head onto said tow hitch and for effecting alignment of said tongue with said draft member regardless of the azimuth of said tow hitch with respect to the longitudinal axis of said draft member.

7. The apparatus of claim 6 wherein said first portion comprises a vertically movable member that is mounted for pivotal movement about a shaft; said second portion comprises a shaft carried by said tongue and penetrating rotatably through said vertically movable member and having fastening means; and wherein a locking means is provided for locking said tongue and said draft member together once they are aligned and brought together.

* * * * *